(12) United States Patent
Tuffile et al.

(10) Patent No.: US 11,628,493 B2
(45) Date of Patent: Apr. 18, 2023

(54) INFILTRATED FERROUS MATERIALS

(71) Applicant: MACLEAN-FOGG COMPANY, Mundelein, IL (US)

(72) Inventors: Charles D. Tuffile, Dighton, MA (US); Harald Lemke, Northport, NY (US); Patrick E. Mack, Milford, MA (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 255 days.

(21) Appl. No.: 15/014,637

(22) Filed: Feb. 3, 2016

(65) Prior Publication Data

US 2016/0221083 A1 Aug. 4, 2016

Related U.S. Application Data

(60) Provisional application No. 62/111,395, filed on Feb. 3, 2015.

(51) Int. Cl.
*C22C 38/38* (2006.01)
*C22C 38/36* (2006.01)
(Continued)

(52) U.S. Cl.
CPC .......... *B22F 1/10* (2022.01); *B22F 3/26* (2013.01); *B22F 10/10* (2021.01); *B22F 10/14* (2021.01); *B33Y 10/00* (2014.12); *C22C 33/0285* (2013.01); *C22C 38/02* (2013.01); *C22C 38/04* (2013.01); *C22C 38/22* (2013.01); *C22C 38/32* (2013.01); *C22C 38/34* (2013.01); *C22C 38/36* (2013.01); *C22C 38/38* (2013.01); *B22F 2998/10* (2013.01); *B33Y 80/00* (2014.12)

(58) Field of Classification Search
CPC combination set(s) only.
See application file for complete search history.

(56) References Cited

U.S. PATENT DOCUMENTS 4,710,223 A * 12/1987 Matejczyk ................ B22F 3/10
75/247
5,204,055 A 4/1993 Sachs et al.
(Continued)

FOREIGN PATENT DOCUMENTS

CN 101812657 8/2010
CN 101812657 A * 8/2010
(Continued)

OTHER PUBLICATIONS

Barroi et al. Cladding and addtivie layer manufacturing with a laser supported arc process. Proceedings of the Solid Freeform Fabrication Symposium. Jan. 2011. 164-174 (Year: 2011).*
(Continued)

*Primary Examiner* — Paul A Wartalowicz
*Assistant Examiner* — Stephani Hill
(74) *Attorney, Agent, or Firm* — Brooks Kushman P.C.

(57) ABSTRACT

Metallic alloys and methods for the preparation of free-standing metallic materials in a layerwise manner. The resulting layerwise construction provides a metallic skeleton of selected porosity which may be infiltrated with a second metal to provide a free-standing material that has a volume loss of less than or equal to 130 mm$^3$ as measured according to ASTM G65-04 (2010).

14 Claims, 2 Drawing Sheets

(51) Int. Cl.
  *C22C 38/34* (2006.01)
  *C22C 38/32* (2006.01)
  *C22C 38/22* (2006.01)
  *C22C 38/04* (2006.01)
  *C22C 38/02* (2006.01)
  *B33Y 10/00* (2015.01)
  *B22F 3/26* (2006.01)
  *B22F 10/10* (2021.01)
  *B22F 10/14* (2021.01)
  *B22F 1/10* (2022.01)
  *C22C 33/02* (2006.01)
  *B33Y 80/00* (2015.01)

(56) References Cited

U.S. PATENT DOCUMENTS

| | | | |
|---|---|---|---|
| 5,819,154 | A | 10/1998 | Hu et al. |
| 6,112,804 | A | 9/2000 | Sachs et al. |
| 6,709,739 | B1 | 3/2004 | Mullen et al. |
| 6,719,948 | B2 | 4/2004 | Lorenz et al. |
| 7,250,134 | B2 | 7/2007 | Kernan et al. |
| 2004/0140078 | A1* | 7/2004 | Liu ............ B22C 9/04 164/34 |
| 2005/0109431 | A1 | 5/2005 | Kernan et al. |
| 2008/0038144 | A1 | 2/2008 | Maziasz |
| 2008/0199720 | A1 | 8/2008 | Liu |
| 2011/0100720 | A1 | 5/2011 | Branagan et al. |
| 2013/0078448 | A1 | 3/2013 | Tucker et al. |
| 2013/0136941 | A1 | 5/2013 | Zheng et al. |
| 2013/0167965 | A1 | 7/2013 | Cheney et al. |
| 2014/0271319 | A1* | 9/2014 | Zheng ............ B22F 7/04 419/9 |

FOREIGN PATENT DOCUMENTS

| | | | | |
|---|---|---|---|---|
| CN | 107527702 | A * | 12/2017 | |
| EP | 499889 | | 8/1992 | |
| EP | 0499889 | A1 * | 8/1992 | ........... B23K 35/304 |
| JP | H04183840 | A * | 6/1992 | |
| JP | H07216411 | | 8/1995 | |
| JP | 2015083715 | A * | 4/2015 | |
| WO | WO2008115130 | | 9/2008 | |
| WO | 2011/053928 | | 5/2011 | |
| WO | 2015006697 | | 1/2015 | |

OTHER PUBLICATIONS

Napadlek et al. Study of selected properties of nanostructured hardfacings prepared by laser technique which are intended for machine parts with increased wear resistance under friction conditions. Tribologia (2010), 41(5), 21-36. (Year: 2010).*
EP 0499889 machine translation (Year: 1992).*
Napadlek et al. Study of selected properties of nanostructured hardfacings prepared by laser technique which are intended for machine parts with increased wear resistance under friction conditions. Tribologia (2010), 41(5), 21-36. Written English Translation. (Year: 2010).*
CN 101812657 machine translation (Year: 2010).*
JP H04-183840 machine translation (Year: 1992).*
CN 107527702 machine translation (Year: 2017).*
JP 2015-083715 machine translation (Year: 2015).*
European Search Report dated Aug. 7, 2018 issued in related European Patent Application No. 16747184.6.
Samuel M. Allen and Emanuel M. Sachs, Three-Dimensional Printing of Metal Parts for Tooling and Other Applications, Metals and Materials, Nov. 1, 2000, vol. 6, No. 6 (2000), pp. 589-594, Cambridge, MA.
International Search Report dated Apr. 8, 2016 issued in related International Patent Application No. PCT/US2016/016356.
European Office Action dated Mar. 25, 2019 issued in related European Application No. 16747184.6.
Chinese Office Action dated Nov. 1, 2018 issued in related Chinese Patent Application No. 201680017725.9.
Chinese Office Action dated Jul. 26, 2019 issued in related Chinese Patent Application No. 201680017725.9.
European Office Action dated Oct. 22, 2019 issued in related European Patent Application No. 16747184.6.
Canadian Office Action dated Apr. 20, 2020 issued in related Canada Patent Application No. 2,983,062.
Translation of Japanese Office Action dated Feb. 14, 2020 issued in related Japanese Patent Application No. 2017-559288.
Australian Office Action dated Mar. 4, 2020 issued in related Australian Patent Application No. 2016215334.
Indian Office Action dated Dec. 4, 2020 issued in related Indian Patent Application No. 201717029886.

\* cited by examiner

INFILTRATED FERROUS MATERIALS

CROSS REFERENCE TO RELATED APPLICATIONS

This application claims the benefit of U.S. Provisional Patent Application Ser. No. 62/111,395 filed Feb. 3, 2015, which is fully incorporated herein by reference.

FIELD OF THE INVENTION

The present invention relates to alloys and methods for the preparation of free-standing metallic materials in a layerwise manner.

BACKGROUND

Many applications, such as those found in tooling, dies, drilling, pumping, agriculture, and mining, require parts with high wear resistance to increase the durability and life expectancy of the parts before they must be changed or refurbished. Materials have been designed to provide high wear resistance to parts by either providing a bulk material with high wear resistance, or providing a composite material consisting of a low wear resistance matrix containing high wear resistance particles throughout the matrix. Many of these materials require a hardening heat treatment such as a quench and temper treatment to obtain the structures that provide wear resistance. While the hardening treatments are effective in increasing the wear resistance of the materials, they can have a deleterious effect on the dimensional control and integrity of parts subjected to the hardening treatment due to part distortions and cracking from thermally induced stresses.

Layerwise construction can be understood herein as a process where layers of a material are built up, or laid down, layer by layer to fabricate a component. Examples of layerwise construction include powder bed fusion with a laser or electron-beam energy source, directed energy deposition, binder jetting, sheet lamination, material extrusion, material jetting, and vat photopolymerization. The primary layerwise construction processes used with metal include powder bed fusion, directed energy deposition and binder jetting. The focus of this invention is in the area of binder jetting including infiltration of binder jet parts.

The binder jetting process is a layerwise construction process that has excellent capability to construct net shape parts by jetting (or printing) a binder onto a bed of powder, curing the binder, depositing a new layer of powder, and repeating. This process has been commercially used to produce parts from sand, ceramics, and various metals including Type 316 stainless steel and Type 420 stainless steel, hereinafter referred to by their UNS designations S31600 and S42000, respectively.

Due to the nature of the bed of powder in a solid-state binder jetting process, parts produced in this method inherently have significant porosity. After curing the printed binder, "green bonded" metal parts typically have porosity greater than or equal to 40%. Sintering of the green bonded parts increases the robustness of the parts by creating metallurgical bonds between the particles and also decreasing the porosity. Long sintering times can be used to reduce the porosity by more than 5%, however, this also results in part shrinkage and distortion of the parts, and can negatively affect the material structure. Therefore, the goal of sintering of green-bonded binder jet parts is to increase part strength by creating inter-particle metallurgical bonds but also minimize distortion and shrinkage by minimizing the reduction in porosity. Sintering shrinkage is typically in the 1-5% range for binder jet parts, with a similar reduction in porosity, which results in sintered parts with more than 35% porosity.

Porosity in sintered parts negatively affects the part's mechanical properties, thus it is desired to further reduce the porosity of sintered parts. Infiltration via capillary action is a process used to reduce porosity by filling the voids in a sintered part with another material that is in a liquid phase. Part infiltration is used with sintered binder jet parts, as well as with many powder metallurgy processes and is thus well known. The primary issues that can be encountered with infiltration include poor wettability between the sintered skeleton and infiltrant leading to incomplete infiltration, material interactions between the sintered skeleton and the infiltrant such as dissolution erosion of the sintered skeleton and new phase formation, and internal stresses that can develop due to mismatched material properties.

Attempts at developing new material systems have been made for the binder jetting and infiltration process, however, due to the issues defined above, very few have been able to be commercialized. The two metal material systems that exist for binder jetting of industrial products are (1) S31600 infiltrated with 90-10 bronze, and (2) S42000 infiltrated with 90-10 bronze. The S31600 alloy has the following composition in weight percent: $16<Cr<18$; $10<Ni<14$; $2.0<Mo<3.0$; $Mn<2.0$; $Si<1.0$; $C<0.08$, balance Fe. S31600 is not hardenable by a heat treatment, and it is soft and has low wear resistance in the as-infiltrated condition. Hence, bronze infiltrated S31600 is not a suitable material for high wear resistant parts. The S42000 alloy has the following composition in weight percent: $12<Cr<14$; $Mn<1.0$; $Si<1.0$; $C\geq0.15$, balance Fe. S42000 is hardenable via a quench and temper process, and is thus use as the wear resistant material for binder jet parts requiring wear resistance.

The process used for infiltrating binder-jet S42000 parts includes burying the parts in a particulate ceramic material that acts as a support structure to support the parts and resist part deformation during the sintering and infiltration processes. Encasing the binder-jet parts in the ceramic also facilitates homogenization of heat within the part, which reduces thermal gradients and potential for part distortion and cracking from the gradients. S42000 is dependent on a relatively high quench rate from the infiltration temperature to convert the austenitic structure to the martensitic structure that provides high hardness and wear resistance. S42000 is considered an air hardenable alloy, however, it is highly recommended that parts be quenched in oil to ensure that the cooling rate is sufficient throughout the part thickness to convert all austenite to martensite. When quenching from the infiltration temperature for 90-10 bronze, oil quenching has a typical quench rate of greater than 20° C./sec, whereas the air quench rate is approximately 5° C./sec. The combination of the quenching capabilities of the infiltration furnace and ceramic layer around the binder-jet parts, which acts as a thermal barrier in quenching, limits the quench rate that is achievable for the parts and thus the hardness of the parts.

It is therefore desired to produce net shaped parts via binder jetting and infiltration that have high wear resistance and can be used in applications requiring such.

SUMMARY

The present disclosure relates to both a product and method wherein layer-by-layer construction is applied to metallic alloys to produce a high wear resistant free-standing material that is stable at high temperatures. The wear resistance values are an order of magnitude greater than those of the commercially available bronze infiltrated S42000 material produced using the layer-by-layer construction process of the present invention. For example, the wear resistance of the material results in a volume loss of less than or equal to 130 mm$^3$ as measured by ASTM G65-10-04 (2010) Procedure A. The structures that enable high wear resistance are preferably achieved without the need for post-treating of the layer-by-layer build up with a thermal hardening process, such as by quenching and tempering or solutionizing and ageing, and the structures remain stable at relatively high temperatures. The layer-by-layer construction allows for the formation of metallic components that may be utilized in applications such as injection molding dies, pumps, and bearings.

DETAILED DESCRIPTION

Figure 1:
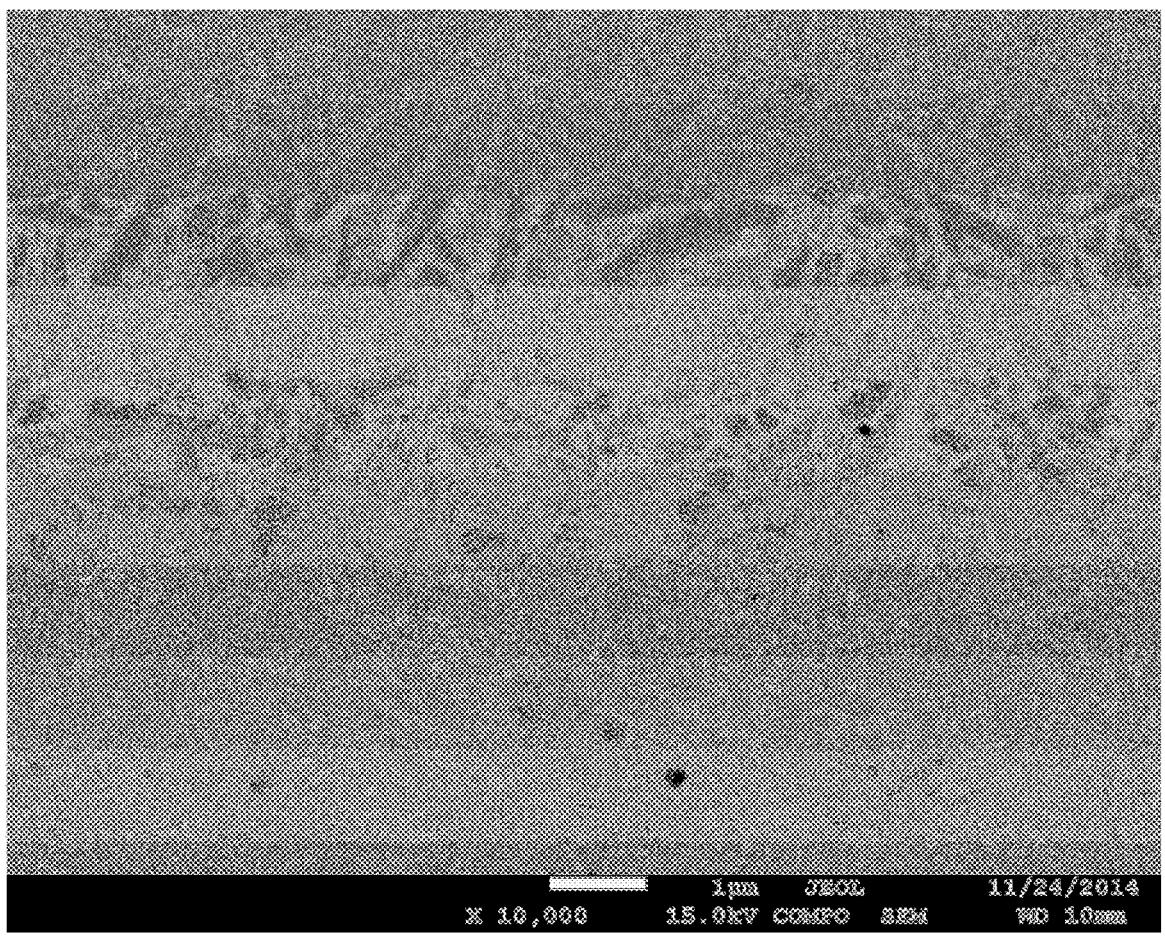
FIG. 1 shows the microstructure of the ferrous alloy A1 powder.

The present invention relates to a method of constructing free-standing and relatively hard and wear-resistant iron-based metallic materials via a layer-by-layer build-up of successive metal layers followed by sintering and infiltration of the metallic structure. Reference to a free-standing metallic material is therefore to be understood herein as that situation where the layer-by-layer build-up is employed to form a given built structure which is then sintered and infiltrated with another material. The infiltrated structure may then serve as a metallic part component in a variety of applications such as injection molding dies and pump and bearing parts.

The layer-by-layer procedure described herein is commonly known as binder jetting where a liquid binder is selectively printed on a bed of powder, the binder is dried, a new layer of powder is spread over the prior layer, the binder is selectively printed on the powder and dried, and this process repeats until the part is fully constructed.

The binder can be any liquid that can be selectively printed through a print head, and when dried acts to bond the powder particles such that additional layers can be subsequently built on top of the present layer, and when cured produces a bond between the particles that enables the part to be handled without damaging the part ("green bond"). The binder must also be able to be burned off in a furnace such that it does not interfere with sintering of the powder particles in the part. An example of a binder that is suitable for binder jetting is a solution of ethylene glycol monomethyl ether and diethylene glycol. In each layer the binder is dried, after it is printed, with a heating source that heats the powder surface in the range of 30-100° C. When the part is completely built the binder in the part can be cured in an oven at a temperature in the range of 100-300° C., and more preferably in the range of 150-200° C. The time at temperature for curing is in the range of 2-20 hr, and more preferably in the range of 6-10 hr.

The layer-by-layer procedure herein contemplates a build-up of individual layers each having a thickness in the range of 0.010-0.300 mm, and more preferably in the range of 0.070-0.130 mm. The layer-by-layer procedure may then provide for a built up construction with an overall height in the range of 0.010 mm to greater than 100 mm, and more typically greater than 300 mm. Accordingly, a suitable range of thickness for the built-up layers is 0.010 mm and higher. More commonly, however, the thickness ranges are from 0.100-300 mm. The packing of solid particles in the layer-by-layer procedure results in printed and cured parts with an inter-particle porosity in the range of 20-60%, and more particularly in the range of 40-50%.

During powder layer spreading, spherical shaped particles flow more easily than non-spherical shaped particles as they have more freedom to roll and less potential to agglomerate due to irregular shapes catching onto one another. The metal powders used to produce the sintered ferrous skeleton have a generally spherical shape and a particle size distribution in the range of 0.005-0.300 mm, and more preferably in the range of 0.010-0.100 mm, and even more preferably in the range of 0.015-0.045 mm.

The relatively high hardness and wear resistance of the iron based alloy powders, which are used to produce the steel skeleton, is contemplated to be the result of the relatively fine scale microstructures and phases present in the iron-based alloy when processed in a liquid phase atomization process that is utilized to produce the powder. More specifically, the iron-based alloys herein are such that when formed into the liquid phase at elevated temperatures and allowed to cool and solidify into powder particles, the structure preferably consists of a relatively high volume fraction of homogeneously distributed hard carbide phases such as borocarbides, molybdenum carbides, niobium carbides, chromium carbides, and complex carbides in an Fe-rich matrix, where the carbide phases range in size from about 10-10,000 nm. FIG. 1 shows the structures in an example of the ferrous alloy (A1) powder of the present invention.

An exemplary ferrous alloy comprises at least 50 atomic % Fe and at least one element selected from the group consisting of Ti, Zr, Hf, V, Nb, Ta, Cr, Mo, Mn, W, Al, La, Ce, Pr, Nd, Sm, Eu, Gd, Tb, Dy, Ho, Er, Tm, Yb, and Lu; and at least one element selected from the group consisting of B, C, N, O, P, and S. In particular aspects of the present invention, the alloy will have a composition represented by the formula Fe(100-x-y)M(x)B(y) (atomic percent) wherein M represents at least one element selected from Ti, Zr, Hf, V, Nb, Mo, Ta, Cr, W, and Mn, wherein $30 \geq x \geq 4$, wherein $25 \geq y \geq 0$, and wherein $45 \geq (x+y) \geq 7$. The alloy can further contain X (Si, Ge, P, Ga, etc.) and/or T (Au, Co, Ni, etc.).

It is worth noting that the above alloys have a relatively high susceptibility to cracking and are typically employed as coatings that contain a relatively high level of cracking. Accordingly, such alloys were not expected to be useful for the layer-by-layer procedure as described herein, and unexpectedly provided metallic components with unexpected hardness and wear properties.

Cured parts produced with the layer-by-layer procedure must be sintered to increase the part strength by developing metallurgical bonds between the particles. The sintering process is a multistage thermal process conducted in a furnace with a controlled atmosphere. The sintering process stages include binder burn-off, sintering, and cool down and are each defined by a specific temperature and time, as well as a ramp rate between prescribed temperatures. The temperature and time for removal of binder (e.g. binder burn off) depends on the binder and part size, with a typical range of temperatures and times for burn off between 300° C. and 800° C. and 30 min to 240 min. Sintering is performed at a temperature and time sufficient to cause inter-particle necks to form, while also minimizing part shrinkage. Sintering is performed in a temperature range of 800-1200° C., and more preferably in the range of 950-1100° C. The sintering time that the entire part is at the sintering temperature is in the range of 1-120 min. Sintering results in a reduction of porosity in the range of 0.1-5% from the cured binder state which has a porosity in the range of 20-60%. Accordingly sintered parts may have a porosity in the range of 15-59.1%.

Figure 2:
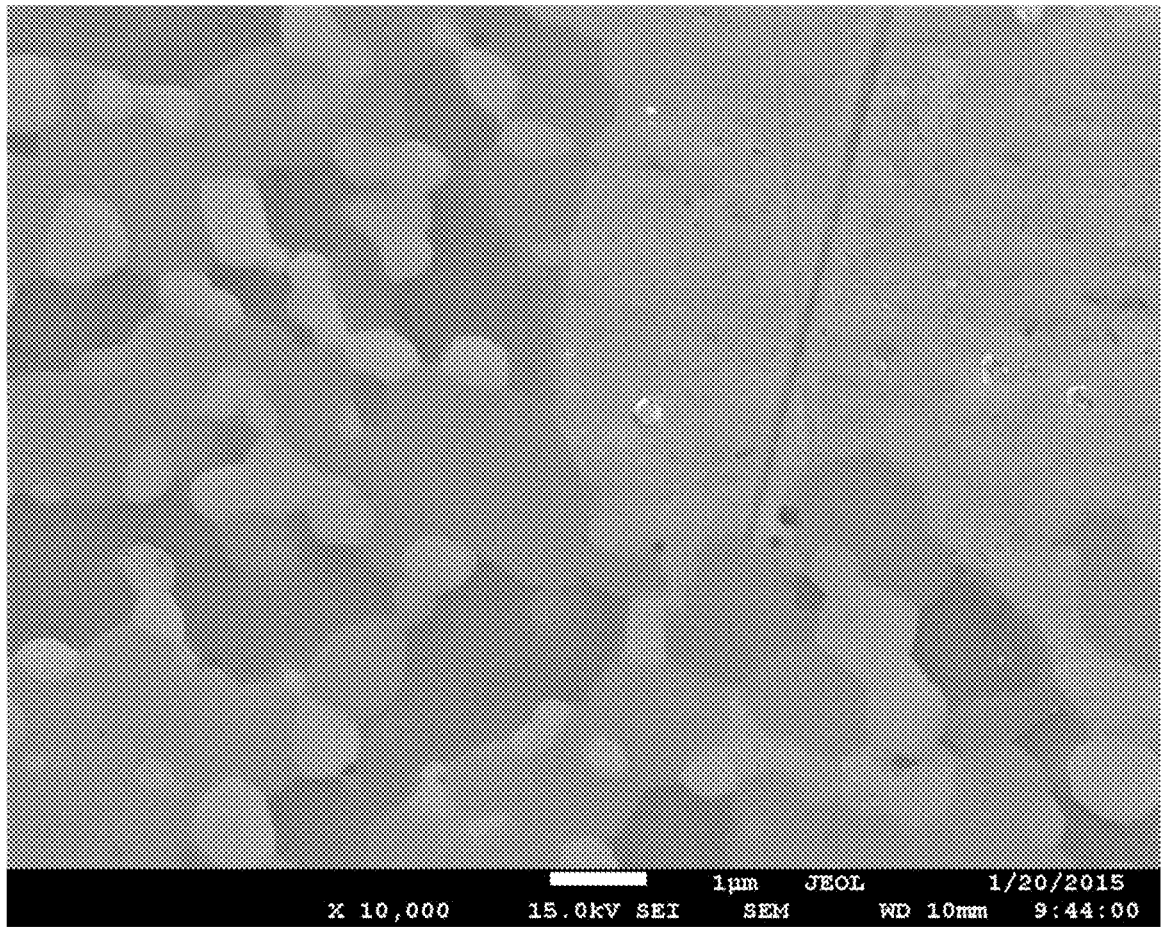
FIG. 2 shows the microstructure of a bronze infiltrated ferrous A1 alloy skeleton of the present invention. The infiltrated bronze is seen in the upper right quadrant and the ferrous skeleton makes up the rest of the micrograph.

To reduce porosity in sintered parts produced with the layer-by-layer procedure the parts may be either cooled following sintering then reheated in a furnace and infiltrated with another material, or infiltration with another material may follow sintering as an additional step within the sintering furnace cycle. In the infiltration process, the infiltrant, in a liquid phase, is drawn into the part via capillary action to fill the voids surrounding the steel skeleton. The final volume ratio of infiltrant to steel skeleton is in the range of 15/85 to 60/40. Following infiltration the infiltrant is solidified by reducing the furnace temperature below the solidus temperature of the infiltrant. Residual porosity following infiltration is in the range of 0-20%, and more particularly in the range of 0-5%. The furnace and parts are then cooled to room temperature. Unlike hardenable steel alloys, the steel alloys of the present invention have a low dependency on cooling rate, and as such can be cooled at a slow rate to reduce the potential for distortion, cracking, and residual stresses during cooling, yet maintain high hardness and wear resistance. Cooling rates of less than 5° C./min, and more particularly less than 2° C./min, can be used to reduce distortion, cracking, and residual stresses. The nano-scale structures in the steel alloys of the present invention that are contemplated to provide high hardness and wear resistance are initially developed via rapid solidification when the steel powder is produced. In the sintering and infiltration furnace cycle, the structures transform to create a uniform equiaxed structure with a scale in the nano-scale realm. Once the structure has transformed to the equiaxed structure it is largely stable throughout the sintering and infiltration temperatures and as such the scale of the structures is retained throughout the furnace cycle enabling the ability to slowly cool the parts. The scale of the structures can be seen in FIGS. 1 and 2, which show an example of the structures in the ferrous alloy (A1) powder and in the steel skeleton after sintering, infiltration, and cooling. Slow cooling reduces distortion thereby enabling high dimensional control and reduced post-production machining to meet the dimensional requirements.

A variety of materials may be used as infiltrants including various metal alloys and polymer resins, such as epoxy resins, which provide a crosslinked polymer structure within the metallic skeleton structure. Metal alloys that are preferably used as infiltrants include copper and various bronze alloys. Bronze is reference to alloys of copper and tin where copper is the primary component (>70%) and tin and/or other metals such as aluminum, manganese, nickel, zinc, iron, manganese, silicon or lead. One preferred criteria for the infiltrant is that it has a liquidus temperature below that of the sintered skeleton and it preferably wets the surface of the sintered skeleton. The primary issues that can be encountered with infiltration include residual porosity, material reactions, and residual stresses. Residual porosity is typically due to one or more of: poor wettability between the sintered skeleton and infiltrant, insufficient time for complete infiltration, or insufficient infiltration temperature resulting in a high viscosity of the infiltrant. Material reactions can occur between the sintered skeleton and the infiltrant such as dissolution erosion of the sintered skeleton and intermetallic formation. Residual stresses can also develop due to mismatched material properties.

It is important to take into consideration the primary criteria and issues when selecting an appropriate infiltrant. Examples of suitable infiltrants for infiltrating the steel skeleton of the present invention are metallic materials such as copper and bronze. Copper (Cu) and bronze are good infiltrants with the steel skeleton because Cu, by itself or in the bronze alloy, preferably wets the iron (Fe) in the steel. The tin (Sn) in bronze preferably depresses the liquidus temperature below that of copper by up to 385° C. depending on Sn concentration, which preferably enables superheating of the bronze to reduce the viscosity, and both Cu and Sn have low solubility in Fe at the superheat temperature. At 1083° C. the solubilities of Cu in Fe, Fe in Cu, Sn in Fe, and Fe in Sn are only 3.2, 7.5, 8.4, and 9.0 atomic percent, respectively. Various bronze alloys may preferably be used including an alloy which has a chemistry of 90 wt % Cu and 10 wt % Sn, hereinafter referred to as Cu10Sn.

While the composite structure of an infiltrated material gains its bulk properties from a combination of the skeleton material and infiltrant, the wear resistance is contemplated to be largely provided by the skeleton in the structure. Hardness is commonly used as a proxy for wear resistance of a material; however, it is not necessarily a good indicator in composite materials. The high load and depth of penetration of macrohardness measurements results in a measurement of the composite material, i.e. a blended mix of the hardnesses of both components, whereas microhardness measurements can be made individually in the infiltrant and in the skeleton areas. The macrohardness of the bulk composite material and the microhardness of the infiltrant and skeleton materials in the bulk composite material for various infiltrated ferrous alloys are shown in Table 1. The wear resistance of these materials, as measured by the ASTM G65-04 (2010) Procedure A method, is also shown in Table 1. The A1 and A2 alloys are exemplary ferrous alloys of the present invention. The A1 alloy has the following composition in weight percent: 17.0<Cr<22.0; 8.0<Mo<12.0; 2.0<B<5.0; 3.0<W<7.0; 0.5<C<2.0; 1.0<Mn<4.0, 1.0<Si<3.0, balance Fe. Alloy A2 has the following composition in weight percent: 12.0<Cr<17.0; 2.0<B<6.0; 1.0<Nb<5.0; 0.5<C<2.0; Mn<2.0; Si<2.0, balance Fe. Accordingly, the presence of Mn and Si in the latter formulation are optional. The S42000 alloy has the following composition in weight percent: 12<Cr<14; Mn<1.0; Si<1.0; C≥0.15, balance Fe. While the macrohardness of the bulk materials and the microhardness of the bronze infiltrant in each material system have similar values, and the microhardness of the steel skeletons of S42000 and the A1 and A2 alloys in the material systems are all within a high-hardness range, the wear resistance is quite different. The order of magnitude difference in wear resistance is contemplated to be the result of the non-optimal hardening conditions of the S42000, and the high volume fraction of the homogeneously distributed small carbide phases present in the steel skeleton of the present invention. It is important to note that the non-optimal hardening of the bronze infiltrated S42000 is an inherent process limitation due to the insufficient cooling rate of the infiltration process to fully transform the austenite in the structure to martensite.

TABLE 1

Hardness and Wear Resistance of Bronze Infiltrated Ferrous Alloys

| Material System (Skeleton-Infiltrant) | Macrohardness [HRC] | Microhardness [HV] | | Volume Loss in Wear [mm³] ASTM G65-04(2010) |
|---|---|---|---|---|
| | | Skeleton | Infiltrant | |
| S42000-Cu10Sn | 21 | 524 | 117 | 366 |
| A1-Cu10Sn | 28 | 810 | 140 | 36 |
| A2-Cu10Sn | 18 | 971 | 116 | 37 |

As can be seen from the above, the volume loss in wear of the alloys herein are, as noted, orders of magnitude lower than S42000-Cu10Sn. It is therefore well within the context of the present invention with respect to the alloys disclosed herein that the volume loss in wear resistance as measured by ASTM G65-04 (2010) is less than or equal to 130 mm³. More preferably, the volume loss in wear resistance herein is such that it falls in the range of 30 mm³ to 130 mm³, including all values and increments therein, such as 30 mm³, 35 mm³, 40 mm³, 45 mm³, etc. up to 130 mm³.

Many hardenable metals have a relatively low maximum operating temperature capability above which the materials soften or embrittle due to phase transformations. For example, the maximum operating temperature for a stable structure of a S42000 is 500° C. In the present invention the high temperature stability of the steel skeleton in the infiltrated parts enables a high operating temperature up to 1000° C.

The thermal properties of infiltrated ferrous alloys are compelling for steel requiring fast thermal cycling such as injection molding dies. The thermal conductivity in bronze infiltrated ferrous alloys is contemplated to be much higher than typical injection molding steels such as the P20 grade due to the nearly order of magnitude higher thermal conductivity of bronze over ferrous alloys. The high thermal conductivity of infiltrated ferrous alloy dies enables high heating and cooling rates through the material. Infiltrated steel parts of the present invention are contemplated to have a low thermal expansion due to the low thermal expansion of the steel skeleton which facilitates dimensional control in applications that require thermal cycling such as injection mold dies. While both the high thermal conductivity, and the low thermal expansion, of the infiltrated ferrous alloys of the present invention result in increased material performance in applications requiring high thermal cycling, the combination of these properties is contemplated to result in materials that offer high productivity and high dimensional control, a combination that is unexpected since as one of these attributes is increased it is normally at the expense of the other.

What is claimed is:

1. A method for layer-by-layer formation of a free-standing metallic part comprising:
    (a) forming an article comprising at least a first layer and a second layer on the first layer, wherein:
        the first and second layers each comprise metallic alloy particles and a binder;
        the metallic alloy particles comprise, in weight percent: 17.0<Cr<22.0, 8.0<Mo<12.0, 2.0<B<5.0, 3.0<W<7.0, 0.5<C<2.0, 1.0<Mn<4.0, 1.0<Si<3.0, balance Fe; and
    forming the article comprises:
        forming the first layer via a binder jetting process; and
        forming the second layer on the first layer via a binder jetting process;
    (b) heating the article to produce a cured article having a porosity ranging from 20 to 60%, wherein the heating cures the binder;
    (c) sintering the cured article, wherein the sintering comprises heating the cured article to remove the binder and cooling at a rate of less than 5° C./minute to form a porous metallic skeleton; and
    (d) infiltrating the porous metallic skeleton with an infiltrant to form the free-standing metallic part, wherein the free-standing metallic part has a wear resistance with a volume loss of less than or equal to 130 mm³ as measured according to ASTM 065-04(2010) Procedure A.

2. The method of claim 1 wherein the metallic alloy particles have a particle size distribution in the range of 0.005-0.300 mm.

3. The method of claim 1 wherein the first and second layers each have a thickness in the range of 0.010 to 0.300 mm.

4. The method of claim 1 wherein the porous metallic skeleton has a porosity in a range of 15% to 59.1%.

5. The method of claim 1 wherein the infiltrating of the porous metallic skeleton is configured to provide a final volume ratio of infiltrant to skeleton in the range of 15/85 to 60/40.

6. The method of claim 1 wherein the infiltrant is a metal alloy.

7. The method of claim 1 wherein the wear resistance of the free-standing part has a volume loss of 30 mm3 to 130 mm³ as measured by ASTM 065-04(2010) Procedure A.

8. The method of claim 1, wherein the cooling is at a rate of less than 2° C./minute.

9. The method of claim 1, wherein during steps (c) and (d) nano-scale structures in the metallic alloy particles transform to create a uniform equiaxed structure.

10. The method of claim 1 wherein the metallic alloy particles consist of the following alloy composition, plus inevitable impurities, in weight percent:
    a) 17.0<Cr<22.0, 8.0<Mo<12.0, 2.0<B<5.0, 3.0<W<7.0, 0.5<C<2.0, 1.0<Mn<4.0, 1.0<Si<3.0, balance Fe.

11. The method of claim 6 wherein the metal alloy is a copper (Cu) alloy.

12. The method of claim 11 wherein the metal alloy is bronze.

13. The method of claim 12 wherein the metal alloy is greater than 70 wt. % Cu.

14. The method of claim 12 wherein the metal alloy is 90 wt % Cu and 10 wt % Sn.

* * * * *